US007131120B2

(12) United States Patent
Veselov (10) Patent No.: US 7,131,120 B2
(45) Date of Patent: Oct. 31, 2006

(54) INTER JAVA VIRTUAL MACHINE (JVM) RESOURCE LOCKING MECHANISM (75) Inventor: Pavel S. Veselov, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 362 days.

(21) Appl. No.: 10/150,181

(22) Filed: May 16, 2002

(65) Prior Publication Data
US 2003/0217092 A1 Nov. 20, 2003

(51) Int. Cl.
G06F 9/44 (2006.01)
(52) U.S. Cl. ...................... 717/164; 717/121
(58) Field of Classification Search ........ 717/120–123, 717/162–165; 709/208–219; 718/1; 707/8
See application file for complete search history.

(56) References Cited

OTHER PUBLICATIONS

Cepeda et al., "Designing Java Applications for Network Computers", www.redbooks.IBM.com, pp. i-xiv, 1-158, 1998.*
Lomet, "Private Lock Management", Digital Equipment Inc., pp. i,ii, 1-26, Nov. 1992.*
Summers et al, "RM: A Resource-Sharing System For Personal Computers", ACM, pp. 91-98, 1983.*
Thornton, "Optimistic Locking with Concurrency in Oracle", www.orafaq.com/papers, pp. 1-9, Feb. 2001.*

* cited by examiner

Primary Examiner—Ted T. Vo
(74) Attorney, Agent, or Firm—Martine Penilla & Gencarella, LLP (57) ABSTRACT A system and method of sharing a resource includes receiving a request for a shared resource in a locking repository. The request is from a requestor and the requestor is one of several applications. Each of the applications is running on one of several Java virtual machines (JVMs). The shared resource is locked to the requester, if the shared resource is identified as available in the master locking repository.

22 Claims, 7 Drawing Sheets

INTER JAVA VIRTUAL MACHINE (JVM) RESOURCE LOCKING MECHANISM

BACKGROUND OF THE INVENTION

1. Field of the Invention

The present invention relates generally to Java™ virtual machines (JVMs), and more particularly, to methods and systems for locking resources that may be shared by multiple applications running in multiple JVMs.

2. Description of the Related Art

Java language programming is an increasing popular software programming language because Java is independent from computing platform (processor and operating system). Java is an interpreted language that uses an intermediate language. The source code of a Java program is compiled to byte code, which cannot be run by itself. The byte code must be converted into machine code at runtime.

A Java virtual machine (JVM) is interprets the byte code to machine code that is compatible with the underlying computing platform. Each type of computing platform requires a specific JVM. Therefore, the byte code of a Java program can be executed on any computing platform that has a JVM that is compatible with the underlying computing platform.

The underlying computer platform, peripheral devices, and the software and data available to underlying computer platform are referred to as resources. A software application being executed on the computing platform can use the resources required to complete the execution of the software application. Often a computer platform will have multiple software applications being executed simultaneously. Often more than one of the multiple software applications may utilize the same resource. For example, two applications may use a single audio channel to output respective audio signals. Therefore, the single audio channel is a shared resource that is shared by the two applications. Use of a shared resource must be arbitrated between the multiple software applications to avoid conflicts and errors.

Similar to an underlying computing platform, each JVM can simultaneously execute multiple applications. Typically, a JVM includes mechanisms to prevent multiple applications from simultaneously accessing a shared resource. By way of example, the JVM includes a JDK. The JDK is a set of objects that the byte code can call to execute the desired operations. Each object in the JDK includes a monitor. The monitor can be claimed or locked by only one application at a time. If a first application locks a first object, by locking the first objects monitor, and then a second application attempts to claim or lock the first object, the first object's monitor will not lock to the second application because the monitor was previously locked to the first application.

Often multiple JVMs may be run at the same time on one computing platform. By way of example, a server may run multiple JVMs to distribute the workload required by the multiple Java programs being executed.

A resource can also be shared among multiple applications that are being executed on multiple JVMs that are on separate (e.g., networked) computing platforms. In one instance and first application is executed on a first JVM on a first computing platform, and a second application is executed on a second JVM on a second computing platform. The first application and the second application can both access a shared resource such as a single database field. The first application can write a first value to the database field. The second application can then write a second value to the database field. Then the first application can read the database field for further processing. However, since the second value was stored in the database field, the second value will be retrieved instead of the intended first value, thereby resulting in errors in the first application.

As described above, the JVMs do not include a system or method to arbitrate the usage of the shared resource (e.g., the database field) that may be shared by multiple applications running in two or more JVMs. As described above, the different JVMs can also be operating on separate, linked computing platforms, which can further complicate the arbitration of the shared resource.

In view of the foregoing, there is a need for a system and method for managing resources that may be shared by multiple applications running in multiple JVMs.

SUMMARY OF THE INVENTION

Broadly speaking, the present invention fills these needs by providing a system and method for managing resources that may be shared by multiple applications running in multiple JVMs. It should be appreciated that the present invention can be implemented in numerous ways, including as a process, an apparatus, a system, computer readable media, or a device. Several inventive embodiments of the present invention are described below.

A system and method of sharing a resource includes receiving a request for a shared resource in a locking repository. The request is from a requestor and the requester is one of several applications. Each of the applications is running on one of several Java virtual machines (JVMs). The shared resource is locked to the requester, if the shared resource is identified as available in the master locking repository.

In one embodiment, the request identifies the requestor and identifies the shared resource being requested. Identifying the shared resource being requested can include identifying a category of shared resources. The category of shared resources can include several shared resources.

In one embodiment, locking the shared resource to the requester, if the shared resource is available can include locking all of the shared resources to the requester, if each of the several shared resources is available.

In one embodiment, the request can include a time stamp. The multiple JVMs can be running on one or more computing platforms in one embodiment.

In one embodiment, if the shared resource is not available, the shared resource is locked to the requestor when the shared resource becomes available. The shared resource is locked to a selected requester from a group of requesters. The selected requestor has a higher priority than the remaining requestors in the group of requesters.

In one embodiment, a method of unlocking a shared resource includes receiving an unlock request from an unlock requester. The unlock request can include a request to unlock a shared resource that was previously locked to a lock requestor. The unlock requester is compared to the lock requestor to determine if the unlock requestor is the same as the lock requestor. The shared resource is unlocked if the unlock requester is the same as the lock requestor.

In one embodiment, a method for a requestor application to select a shared resource includes determining a current status of a first shared resource. The first shared resource is locked to the requestor application if the first shared resource is available. Determining the current status of the first shared resource can include sending a status query to a locking repository and receiving a status response from the locking repository.

In one embodiment, the method for a requestor application to select a shared resource can also include determining a current status of a second shared resource if the first shared resource is unavailable. The second shared resource is locked to the requester application if the second shared resource is available.

In one embodiment locking the first shared resource can include sending a request for the first shared resource to a locking repository. The first shared resource is locked to the requestor in the locking repository if the first shared resource is available.

In one embodiment a method of selecting a master locking repository includes instantiating a first application that includes a first library. A query for a master locking repository is sent from the first library to a second library, if a second library has been instantiated in a second application. A master locking repository is instantiated in the first library, if the second library does not respond to the query. Alternatively, if the second library responds to the query a slave locking repository is instantiated in the first library. The second library will respond to the first query if the first library and the second library are the same type.

In one embodiment a method of selecting a master locking repository can also include instantiating a group of applications. Each one of the group of applications can include a corresponding one of a group of libraries. A query for a master locking repository can be sent from each one of the group of libraries to the master locking repository. A corresponding group of slave locking repositories is instantiated in each one of the group of libraries when the master locking repository responds to the query from each corresponding one of the group of libraries.

In one embodiment a method of selecting a master locking repository can also include detecting a shutdown of the first application. One of the group of slave locking repositories is selected as a new master locking repository. The data in the master locking repository is transferred to the selected slave locking repository. The selected slave locking repository is designated as the master locking repository, if the data transfer was successful.

In one embodiment if the data transfer was unsuccessful, then one of the group of slave locking repositories is selected as a new master locking repository.

The present invention provides an advantage in that multiple applications that are running on different Java virtual machines (JVMs) can use the same, shared resource without conflicting with the other applications' use of the shared resource.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Several exemplary embodiments for a system and method for locking resources that may be shared by multiple applications running in multiple JVMs will now be described. It will be apparent to those skilled in the art that the present invention may be practiced without some or all of the specific details set forth herein.

Multiple JVMs often use shared resources. For example, a network accessible database may be queried, updated, and read by multiple JVMs. Each of the JVMs can be operating on multiple computing platforms that are distributed around the network. Other resources such as printers and audio channels can also be shared by the JVMs.

Figure 1:
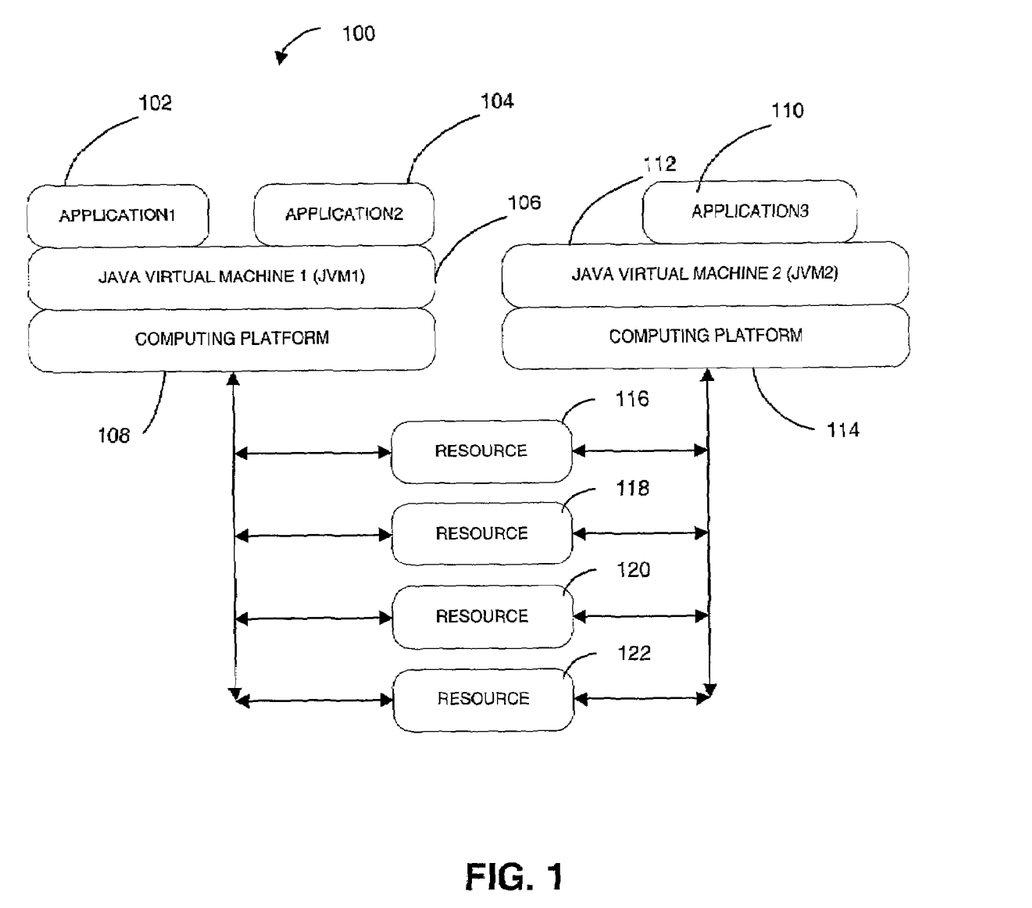
FIG. 1 is a block diagram of multiple applications running on multiple Java virtual machines (JVMs) in accordance with one embodiment of the present invention.
Figure 2A:
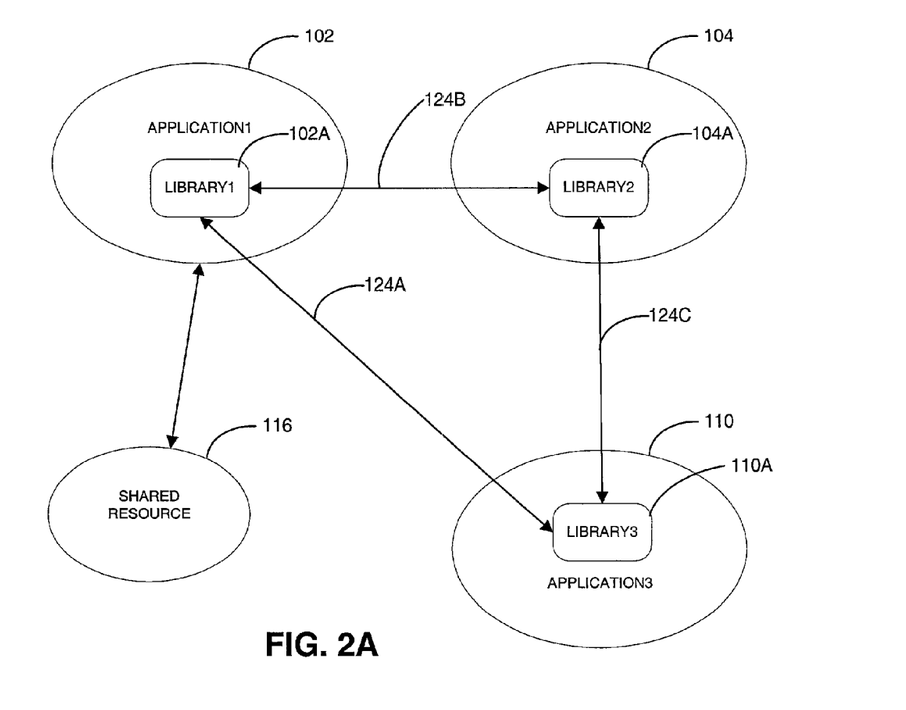
FIGS. 2A–D shows the applications according to various embodiments of the present invention.
Figure 2B:
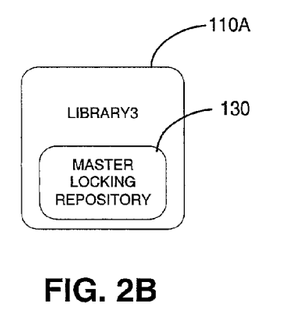
Figure 2C:
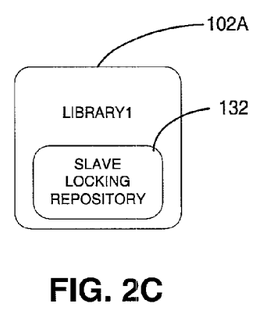
Figure 2D:
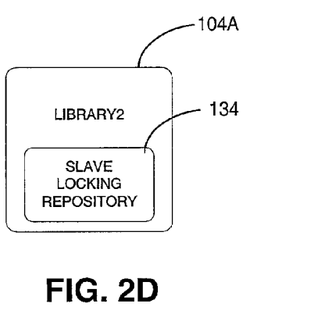

FIG. 1 is a block diagram 100 of multiple applications running on multiple Java virtual machines (JVMs) in accordance with one embodiment of the present invention. Application1 102 and application2 104 are running on a first JVM (JVM1) 106. JVM1 106 is running on a first computing platform and hardware 108. Application3 110 runs on a second JVM (JVM2) 112. JVM2 112 is running on a second computing platform and hardware 114. Resources 116, 118, 120, 122 are shared by the two computing platforms 108, 114. The resources 116, 118, 120, 122 can be virtual resources (e.g., a field in a database or a memory location) or physical hardware resources (e.g., a printer or an audio channel) or combinations thereof. The two computing platforms 108, 114 can also be a single computing platform.

Recall that multiple JVMs 106, 112, do not include a system or a method of managing shared the resources 116, 118, 120, 122 between two (or more) applications 102, 110 that are running on the separate JVMs 106, 112. Such a system or method of managing shared resources 116,118, 120, 122 would prevent application1 102 and application3 110 from using the same shared resource 116 at the same time.

FIGS. 2A–D shows the applications 102, 104, 110 according to various embodiments of the present invention. Each of the applications 102, 104, 110 includes a corresponding library object 102A, 104A, 110A. Communication channels 124A–C between the library objects 102A, 104A, 110A are also shown. The shared resource 116 is shown locked to the application1 102.

The communication channels 124A–C provide a method for the library objects 102A, 104A, 110A to intercommunicate and thereby coordinate which one of the applications 102, 104, 110 a shared resource 116 is currently locked to.

The communication channels 124A–C can use the Java Message Service (JMS) or other inter-application messaging method. JMS is an inter-client communication standard. JMS provides a flexible and powerful API that encourages a fine-grained, modular distribution of functionality among applications and components of applications.

JMS can be used to transmit queries and requests. JMS provides three ways of sending messages: 1) point to point; 2) publish a message to a topic so all subscribed entities will receive the message; 3) Round-robin when there are multiple entities "listening" to a message queue. The first message sent to the queue is delivered to the first "listener" entity. A second message is delivered to the second listener entity. A third message is delivered to a third entity and so on until a message had been sent to each of the listeners. The next message is then sent to the first listener, which begins a new round-robin cycle to each of the listener entities.

Figure 3:
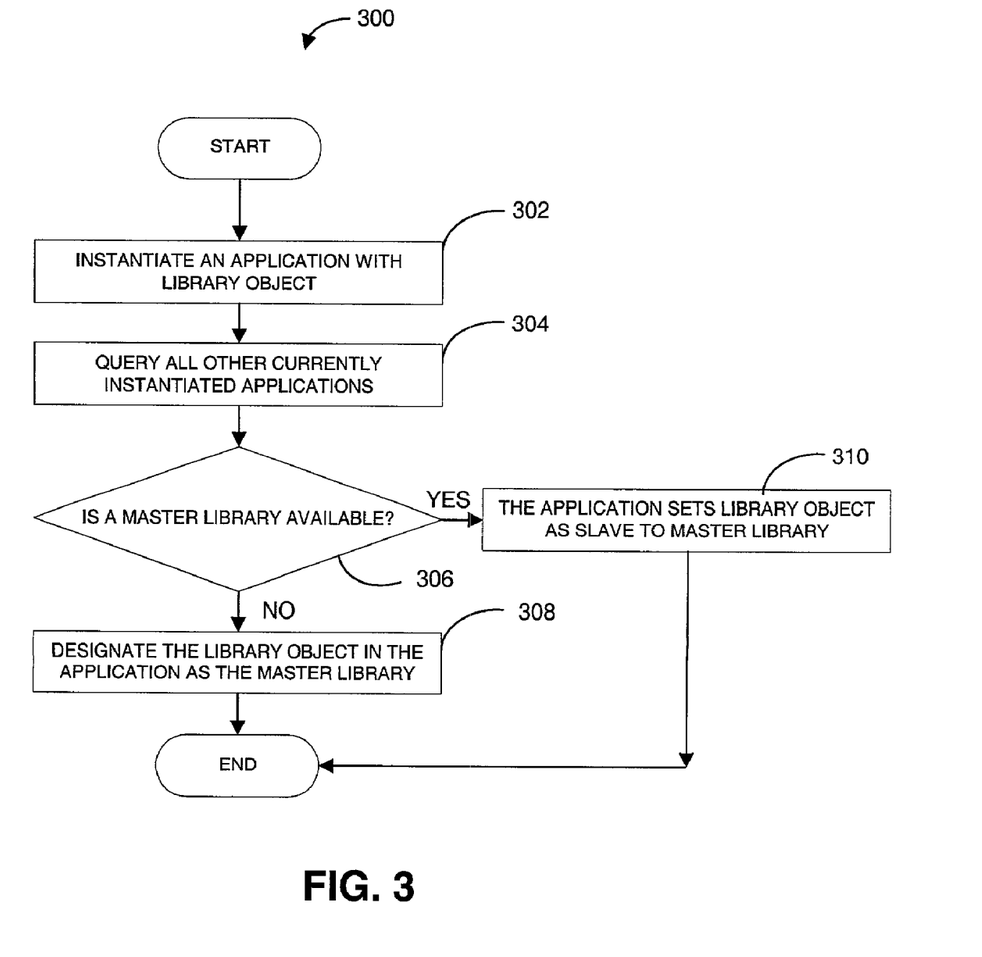
FIG. 3 is a flowchart of the method operations of selecting a master library object according to on embodiment of the present invention.

FIG. 3 is a flowchart of the method operations of selecting a master library object 300 according to on embodiment of the present invention. In operation 302 an application such as application 110 is instantiated. Recall that the application 110 also includes library3 object 110A. In operation 304, the application 110 queries all other applications to determine if any other currently instantiated applications have a library object similar to library3 object 110A in operation 306. If any other currently instantiated applications have a library object similar to library3 object 110A in operation 304, the library object will be the master library. Therefore, in one embodiment of operation 304, the master library will receive the query from the application 110 and the master library will respond to the application 110 in operation 308 to designate that the master library is available. Application 110 then sets library object 110A as a slave library object to the master library object in operation 310 and the method operations of determining a master library end.

Returning to operation 306, if a master library fails to respond, in operation 308, then there is no current master library and the library 110A is designated as the master library and the method operations of determining a master library end. When the master library fails to reply within a predetermined time frame it is assumed that there is not a current master library. The predetermined time frame could be a typical data transfer latency period of the system or another predetermined time frame.

In one embodiment, the query to test the presence of a master library can use an implementation that guarantees the exact reply whether a master library currently exists or not. By way of example, trying to bind a TCP/IP port that will fail in case the port is already bound. Alternatively, a JMS queue can be created that will fail if another application has already created the JMS queue that has the same name. Such embodiments could eliminate the need of timeouts and thereby more quickly determine whether a master library is present or not.

In an alternative embodiment, a master library can be selected by having a predefined master library server that is designated to serve locking and unlocking requests. Other libraries can search for such a master library. Failing to search for such a master library could cause the library start-up to fail. Therefore, the application may also fail at start-up or alternatively operate without using the library.

Returning to FIGS. 2B–D, if the library3 110A is designated as the master library in operation 308 of FIG. 3, then the library3 110A will instantiate a master locking repository 130. Since library3 110A is designated as the master library, then application 102, 104 must not yet have been instantiated when application3 110 was instantiated. Therefore, when application1 102 is instantiated after application3 110 was instantiated, such as in operation 302 above, application1 102 will then query the other currently instantiated application (i.e., application 110) seeking a reply from the master library in operations 304 and 306 above. The master library 110A will respond to the application1 102 in operation 306 and the library1 102A in application1 102 will be designated as a slave to the master library 110A in operation 310. Similarly, the library2 104A in application2 104 will also be designated a slave to the master library 110A. In one embodiment, when a library in an application is designated as a slave library to the master library, then the library instantiates a slave locking repository. By way of example, when library1 102A is designated as a slave library to the master library3 110A such as in operation 310 of FIG. 3 above, library1 102A instantiates a slave locking repository 132. Similarly, library2 104A instantiates a slave locking repository 134 once library2 104A has been designated as a slave library. A slave locking repository 132, 134 can be a mirror of the master locking repository 130 such that when a change occurs in the master locking repository 130, the slave locking repositories 132, 134 are then updated to include the same change.

Figure 4:
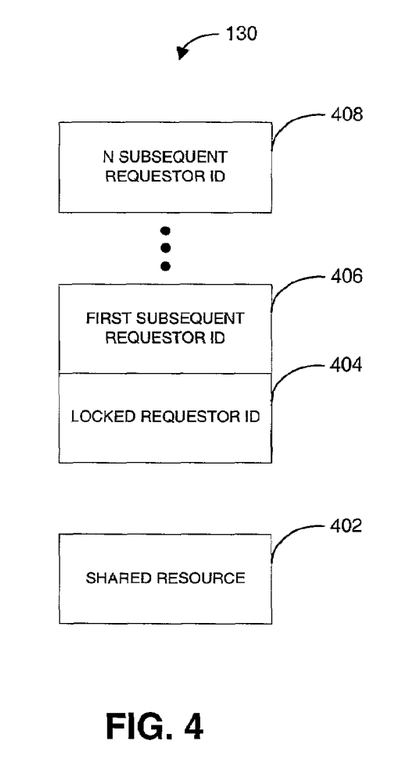
FIG. 4 is master locking repository in accordance with one embodiment of the present invention.

FIG. 4 is master locking repository 130 in accordance with one embodiment of the present invention. The locking repository 130 includes a shared resource identifier 402 and a list of requests 404, 406, 408 for the shared resource. As shown, the locking repository 130 includes only one shared resource identifier 402 however, additional shared resource identifiers (not shown) could also be included. The shared resource identifier 402 identifies the shared resource that is being managed by the master locking repository 130. The identified shared resource is locked to the requester of the first request received for the identified shared resource, as will be described in more detail in FIG. 5 below. Subsequently received requests 406, 408 for the identified shared resource can also be stored in the order received.

Figure 5:
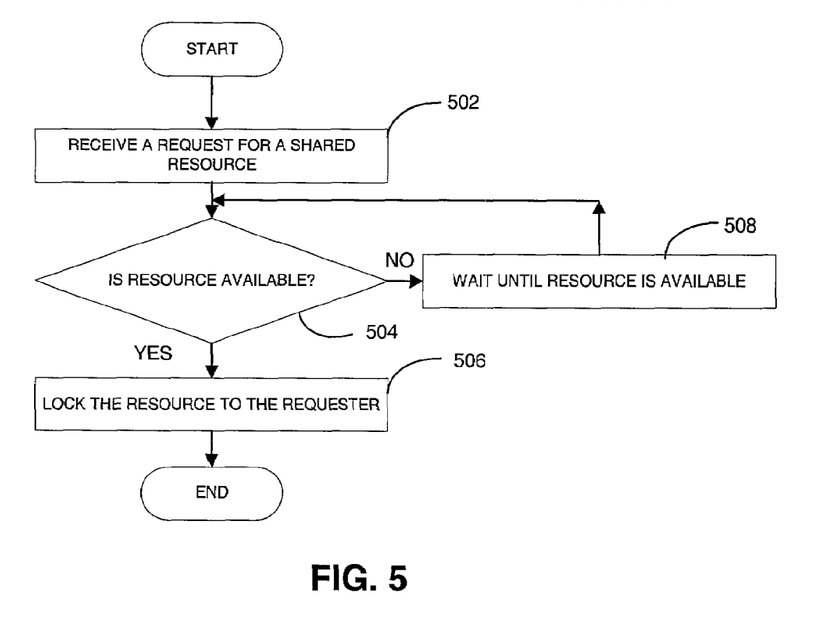
FIG. 5 is a flowchart of the method operations of locking a shared resource to a requestor in accordance with one embodiment of the present invention.

FIG. 5 is a flowchart of the method operations 500 of locking a shared resource to a requestor in accordance with one embodiment of the present invention. In operation 502 a request for a shared resource is received in the master locking repository 130. The request originates from a requester application such as application1 102 of FIG. 2A above. For example, if application1 102 wishes to use shared resource 116, then application1 102 will send a request to the master locking repository 130.

The status of the requested shared resource (i.e. shared resource 116) is determined in operation 504. If the shared resource 116 is available (i.e., is not previously locked to a previous requester), the shared resource 116 is locked to the requestor in operation 506 and the method operations end. The requestor can also be notified that the requested shared resource has been locked to the requestor.

If, in operation 504, the shared resource 116 was not available because the share resource 116 was previously locked to a previous requester, the requestor must wait until the shared resource becomes available, in operation 508. The requestor can also be notified that the requested shared resource is not available and therefore has not been locked to the requester. If in operation 504, the shared resource 116 was not available, then the request can be stored as a subsequent request in the master locking repository as shown in FIG. 4 above. Once the requested shared resource (shared resource 116) becomes available the method operations continue as described in operation 506 above.

When a requested shared resource is locked to an application other than the requesting application in operation 504, the request for the shared resource can be stored as a subsequent request 404, 406, of FIG. 4, in the order received in the master locking repository 130. The subsequent requests 404, 406 are recorded in a priority order in the master locking repository 130. The priority order can be based on the order the request was sent from the requestor applications. In one embodiment, a time stamp could be attached to the request by the requestor application. By way of example, when application2 104 sends a request for the shared resource 116, the request can include a time stamp. When the request is received in the master locking repository 130, the waiting subsequent requests 406, 408 will be ordered in the order of priority of the time stamps.

Alternatively, the priority order can also be in the order received in the master locking repository 130. By way of example, if requests for the shared resource 116 are received in the master locking repository 130 from first application2 104 and then application3 110, the master locking repository 130 will order the waiting subsequent request 406 from application2 104 first, and followed by the subsequent request 408 from application3 110.

The priority order can also be in the order sent or received as described above and also corrected for any network latency that may exist in the communication links 124A–C. The network latency can be maximum or average network latency.

Alternatively, the priority order can be based upon a predetermined priority that is assigned to each of the requester applications. For example, application2 104 can be assigned a higher priority than application3 110. Therefore, if both application2 104 and application3 110 were waiting for shared resource 116 to be released by application1 102, then application2 104 would be first in line even if application3 110 requested shared resource 116 before application2 104.

Figure 6:
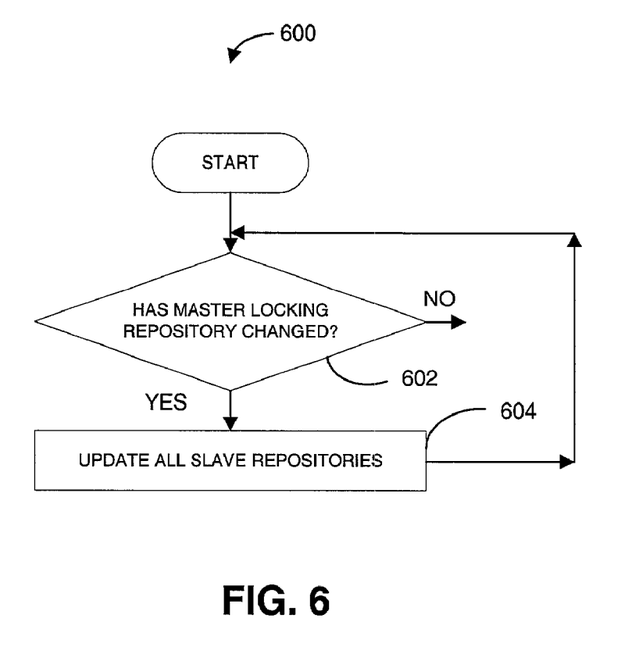
FIG. 6 is a flowchart of the method operations 600 of updating the slave locking repositories in accordance with one embodiment of the present invention.

FIG. 6 is a flowchart of the method operations 600 of updating the slave locking repositories 132, 134 in accordance with one embodiment of the present invention. When a requestor application requests a shared resource or unlocks a shared resource that was previously locked to the requestor application, the master locking repository 130 will record the status of the shared resource. When the master locking repository 130 is updated to record the changed status of the shared resource, in operation 602, the slave locking repositories 132, 134 are automatically updated in operation 604. The method operations then repeat with operation 602. If in operation 602, the master locking repository 130 has not been changed then operation 602 is repeated.

In one embodiment all of the data in the master locking repository 130 is copied to each of the slave repositories 132, 134. Alternatively, only the currently locked shared resources and which applications the shared resources are locked to may be copied to each of the slave repositories 132, 134.

A requestor application can identify when the requester application is locked to a shared resource or not locked and waiting for the shared resource to become available by examining the slave or master locking repository included within the requester application. By way of example, when applications 102 requests shared resource 116, and the shared resource 116 is available, the master locking repository 130 locks the shared resource 116 to the application1 102. Because the master locking repository has changed to show the shared resource is locked to applicaiton1 102, the slave locking repositories 132, 134 are automatically updated. Application1 102 can then refer to the slave locking repository 132 to determine the status of the request to lock the shared resource 116.

Figure 7:
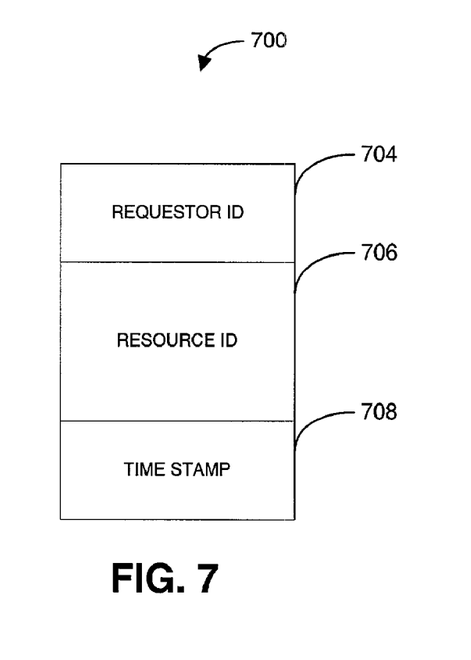
FIG. 7 illustrates a request for a shared resource in accordance with an embodiment of the present invention.

FIG. 7 illustrates a request 700 for a shared resource in accordance with an embodiment of the present invention. The request 700 includes a requestor ID 704 that identifies the requesting application. The request 700 also includes a shared resource ID 706. The request 700 can also include a time stamp 708 as described above. The shared resource ID 706 identifies the shared resource that the requester is requesting. For example, the requester ID 704 would identify application2 104 for any requests sent from application2 104. If the request from application2 104 was a request to use shared resource 116, the shared resource ID 706 would identify the shared resource 116.

The shared resource ID 706 can identify a single shared resource such as shared resource 116 or, in the alternative, can identify a Category of shared resources. The category of shared resources is any predefined grouping of shared resources. Identifying an entire category of shared resources allows locking all individual shared resources that are included in the identified category. In one embodiment a category can be identified as "categoryname".all.

By way of example, a building includes a public address (PA) broadcasting system. The PA system is divided up into areas or zones of the building. Each area is a different shared resource identified as "PA output zone 1" to "PA output zone n" all included in a category identified as a "PA outputs". Several applications each broadcast different music to each of PA output zone 1 to PA output zone n in the respective different areas of the building. If application2 104 has a news message to be broadcast to all areas of the building, once each of the PA output zone 1 to PA output zone n have been unlocked by the previous application, application2 104 can lock each of the PA output zone 1 to PA output zone n. Locking each of the PA output zone 1 to PA output zone n shared resources of the PA system can be accomplished by application2 104 requesting the entire category of PA outputs. All of the shared resources, PA output zone 1 to PA output zone n, would thereafter be locked to application2 104 and therefore be unavailable to any other application. Of course, each of the individual shared resource can also include additional sub-categories of shared resource.

Figures 8, 9:
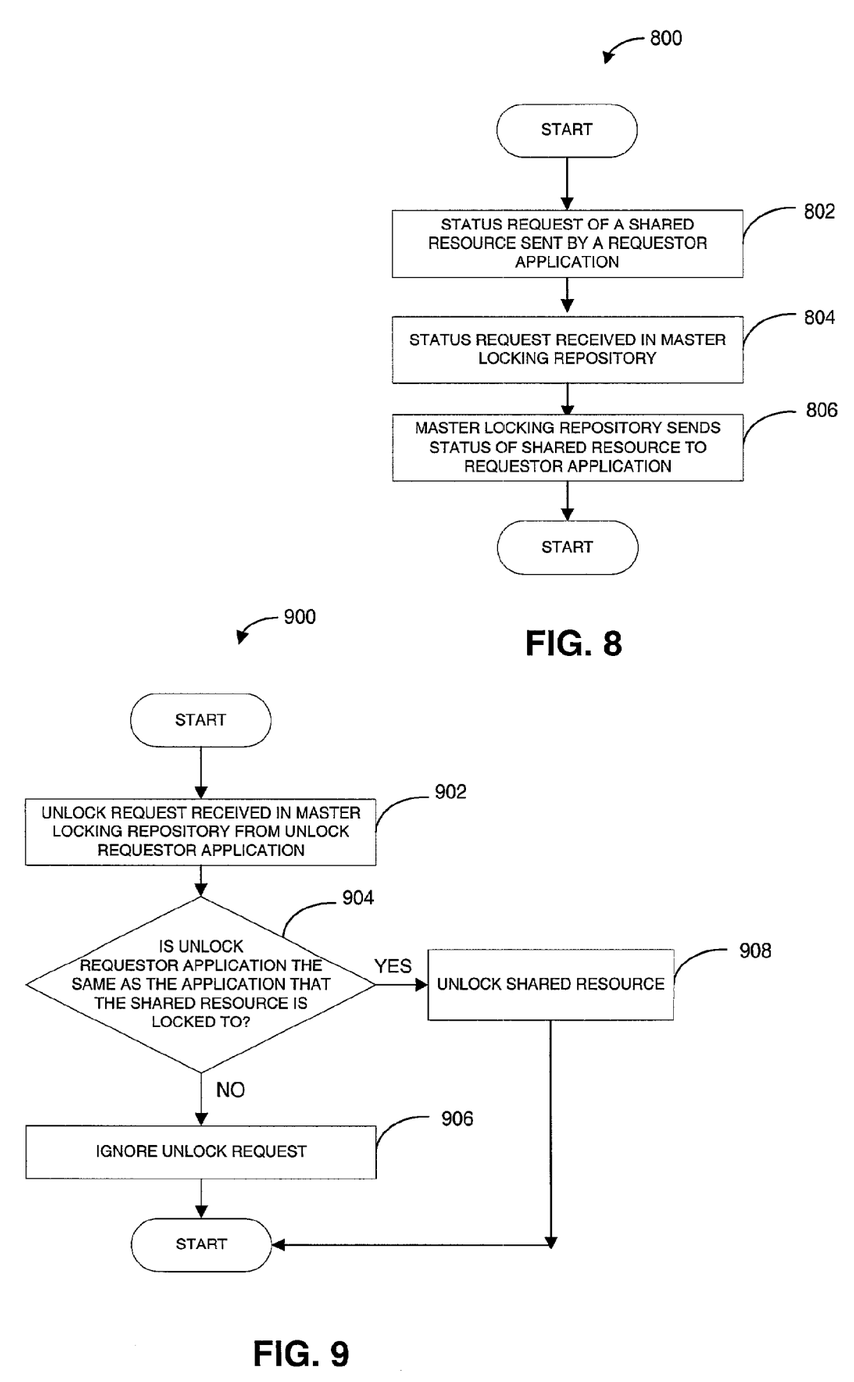
FIG. 8 is a flowchart of the method operations of checking the status of a shared resource in accordance with one embodiment of the present invention.
FIG. 9 is a flowchart of the method operation for unlocking a shared resource that was previously locked in accordance with one embodiment of the present invention.

FIG. 8 is a flowchart of the method operations 800 of checking the status of a shared resource in accordance with one embodiment of the present invention. The method operations of checking the status of a shared resource is similar to the method operations 500 for requesting an object except that the shared resource will not be locked to the requestor nor will the request for the status of the shared resource result in a request that is queued to wait for the shared resource to be come available. In operation 802, a requester application such as application2 104 requests status of a shared resource such as shared resource 116. The request is received in the master locking repository 130 in operation 804. In operation 806, the master locking repository 130 responds to the requester application with the status of either available or unavailable. The status report can also identify if any other requestor applications have requests pending or waiting for the shared resource. In certain instances it may be preferable for a requestor application to determine the availability status of a shared resource before requesting the shared resource. By way of example, if application2 104 needed a data communication channel to send data and if shared resource 118 was a 56 kbps data connection and shared resource 120 was a 1 Mbps data connection. Either of shared resource 118 or shared resource 120 may be suitable. Application2 104 can determine the status of each of the shared communication resources 118, 120 and then select the shared communication resource 118, 120 that best meets the needs of the data. If the data was a large quantity of data then the throughput of the 1 Mbps data connection of shared resource 120 might be preferable over the considerably smaller throughput capability of the 56 kbps of shared resource 118, even if shared resource 120 was not immediately available. Conversely, if the data to be sent is a small quantity, then the 56 kbps throughput capability of the shared resource 118 could be acceptable.

Once a shared resource is locked to a requestor application as described in FIG. 5 above, the shared resource remains locked to the requestor application until the requestor application releases or unlocks the shared resource. FIG. 9 is a flowchart of the method operation 900 for unlocking a shared resource that was previously locked in accordance with one embodiment of the present invention. In operation 902 an unlock request is received in the master locking repository. The unlock request is similar to the request to lock the shared resource as described in FIG. 7 above. The unlock request identifies the source of the unlock request and identifies the shared resource.

In operation 904 the master locking repository compares the received request to the current status of the shared resource that is identified in the unlock request. Specifically, the master locking repository determines if the source of the unlock request (unlock requester) is the same as the application that the shared resource is currently locked to.

If the unlock requestor and the application that the shared resource is currently locked to are not the same application then, in operation 906, the unlock request is ignored and the status of the shared resource is unchanged and the method operations 900 end. This prevents a first application from unlocking a shared resource that is not currently locked to a second application.

If the unlock requestor and the application that the shared resource is currently locked to are the same application then, in operation 908, the shared resource is unlocked and the method operations 900 end. Recall that in FIG. 5, if there are additional requests in the queue waiting for the shared resource, the shared resource will be locked to the next subsequent requestor that is waiting for the shared resource.

By way of example, the shared resource 116 is currently locked to application1 102. Application1 102 sends an unlock request that requests that resource 116 be unlocked. Because application1 102 is both the unlock requestor and the application to which shared resource 116 is currently locked to, the master locking repository unlocks the shared resource 116. Conversely, if the shared resource 116 is currently locked to application1 102 and application2 104 sends an unlock request that requests that shared resource 116 be unlocked. Because application2 104 does not match the application that the shared resource 116 is currently locked to, the unlock request is ignored.

Figure 10:
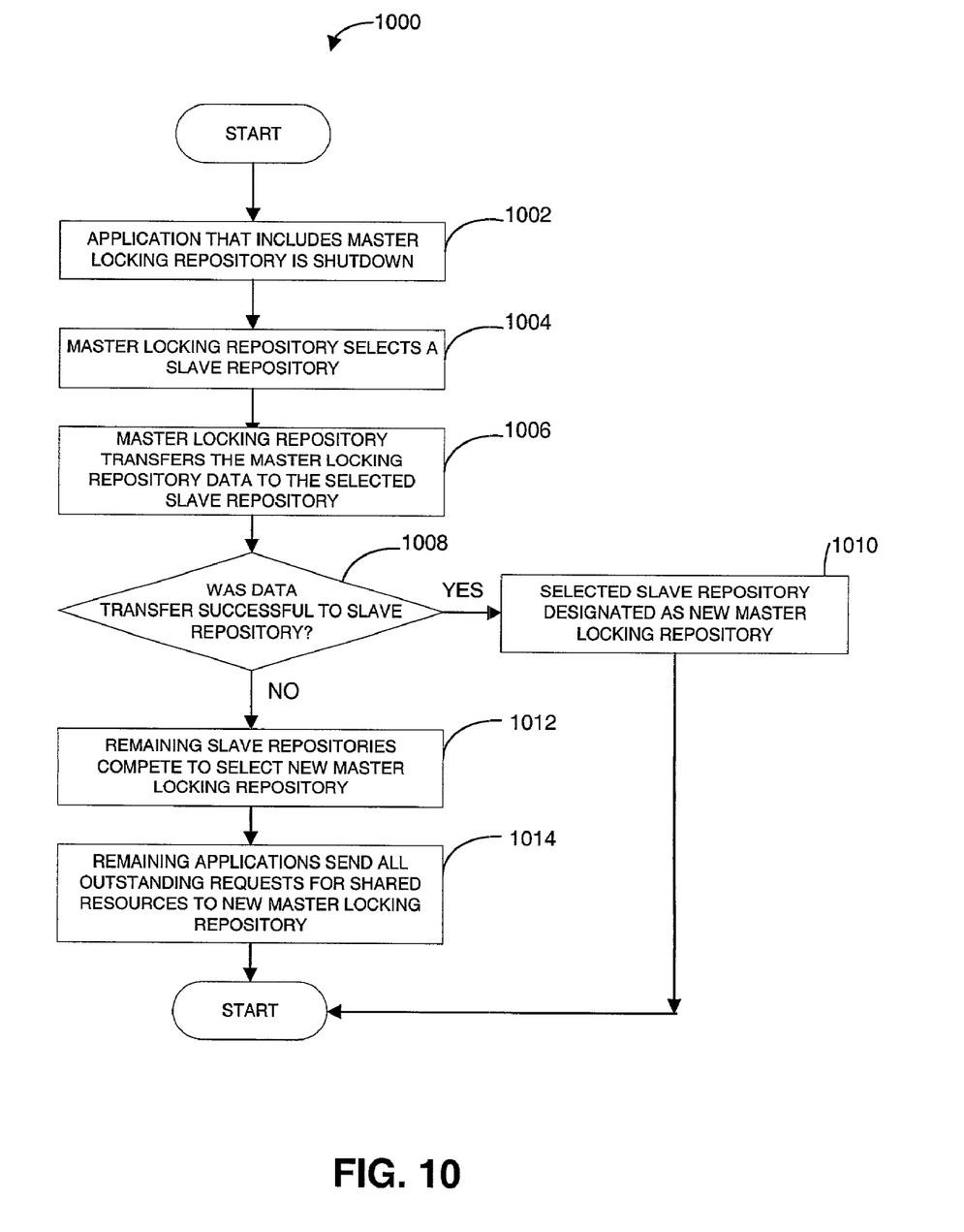
FIG. 10 is a flowchart of the method operation of recovering from a master locking repository failure in accordance with one embodiment of the present invention.

As described above, the availability of the each shared resource is managed through the master locking repository 130. Unfortunately the master locking repository 130 is a virtual resource that may be lost due to power or other hardware failure. FIG. 10 is a flowchart of the method operation 1000 of recovering from a master locking repository failure in accordance with one embodiment of the present invention. In operation 1002, the application that includes the master locking repository is being shut down. The application may be being shut down for any number of reasons such as the power is interrupted to the computing platform that is underlying the application may have been interrupted or the application was being shut down for other reasons (e.g., a manual shutdown). Power interruptions and failures can be detected and the computing platform can continue processing for several machine cycles after a power failure has been detected.

In operation 1004, the master locking repository 130 selects one of the slave repositories 132, 134. Selecting the correct slave repository is important because the master repository will likely only have one attempt to send the data in the master locking repository and also will likely not have an opportunity to confirm the data was received due to the power interruption. Selecting a slave repository can include selecting the slave repository in the application that last sent a request for a shared resource to the master locking repository. This method will most likely ensure that the selected slave repository is still in operation and available to receive the data from the master locking repository. Alternatively, selecting a slave repository can include selecting the next application according to a priority list of the current applications. In still another alternative, the selecting a slave repository can include selecting the application that is the next communication point in a JMS round-robin scheme described above.

In operation 1006, the master locking repository attempts to send the data included in the master locking repository 130 to the selected slave repository. Sending the data in the master repository can include sending all of the data in the master locking repository 130 including both the current list of locked shared resources and the list of subsequent requests for each locked shared resource. Alternatively, if the current list of locked shared resources and the list of subsequent requests for each locked shared resource are already maintained in each of the slave repositories 132, 134, then sending the data may include sending only a status flag that identifies the selected repository as the master locking repository. Alternatively, if each of the slave repositories 132, 134 includes the current list of locked shared resources but not the list of subsequent requests for each shared resource, then sending the data may include sending the list of subsequent requests for each locked shared resource and a status flag that identifies the selected repository as the master locking repository.

In operation 1008, the transfer of the master locking repository data is examined to determine if it was successful. If the master locking repository was successfully transferred to the selected slave repository, then the selected slave repository is identified as the new master locking repository to the other applications, in operation 1010 and the method operations 1000 end.

If the transfer of the master locking repository data is unsuccessful, then in operation 1012 the remaining applications compete to determine which application's library will be the new master locking repository. The remaining applications can compete as described above in FIG. 3. Alternatively, the remaining applications are compared and the remaining application with the earliest instantiation time or other priority designation will prevail as the master locking repository.

In one embodiment all locked shared resources continue to be locked when the transfer of the master locking repository data is unsuccessful. Alternatively, any subsequent requests that were waiting in the queues for each shared resource are lost. Therefore, in response to the change in master locking repositories, the remaining applications repeat any outstanding requests for shared resources in operation 1014 and the method operations 1000 end.

Although the present invention implements Java programming language, other programming languages may be used to implement the embodiments of the present invention (e.g., C, C_{++}, any object oriented programming language, etc.). With the above embodiments in mind, it should be understood that the invention might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIGS. 3, 5, 6, 8, 9, 10 are not required to be performed in the order illustrated, and that all the processing represented by the operations may not be necessary to practice the invention. Further, the processes described in FIGS. 3, 5, 6, 8, 9, 10 can also be implemented in software stored in any one of or combinations computer readable medium.

Although the foregoing invention has been described in some detail for purposes of clarity of understanding, it will be apparent that, certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of sharing a resource comprising:
   providing a plurality of Java Virtual Machines (JVMs) operating in a distributed network, each of the JVMs being capable of executing one or more of a plurality of applications;
   receiving a request for a shared resource from a requestor, the requestor being one of the plurality of applications being executed by one of the plurality of JVMs, the request being forwarded over the distributed network to a master locking repository, the plurality of JVMs being remote from the shared resource and the plurality of JVMs operating on a one or more computing platforms, such that each of the plurality of JVMs are remote from the master locking repository;
   determining if the shared resource is identified as available in the master locking repository; and
   locking the shared resource to the requestor, if the shared resource is identified as available in the master locking repository.

2. The method of claim 1, wherein the request identifies the requestor and identifies the shared resource being requested.

3. The method of claim 2, wherein identifying the shared resource being requested includes identifying a category of shared resources wherein the category of shared resources includes a plurality of shared resources.

4. The method of claim 3, wherein locking the shared resource to the requestor, if the shared resource is available includes locking the plurality of shared resources to the requestor if each one of the plurality of shared resources is available.

5. The method of claim 1, wherein the request includes a time stamp.

6. The method of claim 1, wherein if the shared resource is not available, then:
   waiting until shared resource is available; and
   locking the shared resource to the requestor when the shared resource becomes available.

7. The method of claim 6, wherein the shared resource is locked to a selected requestor of a plurality of requestors, the selected requestor having a higher priority than the remaining requestors in the plurality of requestors.

8. The method of claim 1, further comprising:
   providing a library included in one of the plurality of applications, the library including a slave locking repository, the slave locking repository being a substantial duplicate of the master locking repository;
   wherein determining if the shared resource is identified as available in the master locking repository includes:
      determining if the master locking repository is available;
      locking the shared resource to the requestor, if the master locking repository is available and identifies that the shared resource is available; and
      designating the slave locking repository as a new master locking repository if the if the master locking repository is not available and locking the shared resource to the requestor, if the new master locking repository identifies that the shared resource is available.

9. The method of claim 1, further comprising:
   receiving an unlock request from an unlock requestor, the unlock requestor being one of the plurality of applications being executed by one of the plurality of JVMs, the unlock request being forwarded over the distributed network to the master locking repository, the unlock requestor being remote from the shared resource, the unlock request includes a request to unlock the shared resource that was previously locked to the lock requestor;
   determining if the unlock requestor is the same as the lock requestor; and
   unlocking the shared resource if the unlock requestor is the same as the lock requestor.

10. A method of unlocking a shared resource comprising:
providing a plurality of Java Virtual Machines (JVMs) operating in a distributed network, each of the JVMs being capable of executing one or more of a plurality of applications;
receiving an unlock request from an unlock requestor, the unlock requestor being one of the plurality of applications being executed by one of the plurality of JVMs, the unlock request being forwarded over the distributed network to a master locking repository, the unlock requestor being remote from the shared resource and the master locking repository, the unlock request includes a request to unlock a shared resource that was previously locked to a lock requestor, the lock requestor being remote from the shared resource;
determining if the unlock requestor is the same as the lock requestor; and
unlocking the shared resource if the unlock requestor is the same as the lock requestor.

11. A method for a requestor application to select a shared resource comprising:
providing a plurality of Java Virtual Machines (JVMs) operating in a distributed network, each of the JVMs being capable of executing one or more of a plurality of applications;
determining a current status of a first shared resource in a locking repository, the first shared resource being remote from the locking repository; and
locking the first shared resource to a requestor application if the first shared resource is identified as available in the locking repository, the requestor being remote from the shared resource, the requestor being in communication with the shared resource by the distributed network, the requestor being one of the plurality of applications being executed by one of the plurality of JVMs.

12. The method of claim 11, wherein determining the current status of the first shared resource includes:
sending a status query to the locking repository through the distributed network; and
receiving a status response from the locking repository through the distributed network.

13. The method of claim 11, further comprising:
determining a current status of a second shared resource if the first shared resource is unavailable; and
locking the second shared resource to the requestor application if the second shared resource is available.

14. The method of claim 11, wherein locking the first shared resource includes:
sending a request for the first shared resource through the distributed network to the locking repository;
determining if the first shared resource is available; and
locking the first shared resource to the requestor in the locking repository.

15. A method of selecting a master locking repository comprising:
providing a plurality of Java Virtual Machines (JVMs) operating in a distributed network, each of the JVMs being capable of executing one or more of a plurality of applications;
instantiating a first application of the plurality of applications, the first application including a first library;
sending a query for a master locking repository from the first library to a second library through the distributed network, if a second library has been instantiated in a second application, wherein a source of the query is remote from the first application;
instantiating a master locking repository in the first library, if the second library does not respond to the query; and
instantiating a slave locking repository in the first library, if the second library responds to the query.

16. The method of claim 15, wherein the second library responds to the first query if the first library and the second library are the same type.

17. The method of claim 15, further comprising:
instantiating the plurality of applications, each one of the plurality of applications including a corresponding one of a plurality of libraries;
sending a query through the distributed network for the master locking repository from each one of the plurality of libraries to the master locking repository;
instantiating a corresponding plurality of slave locking repositories in each one of the plurality of libraries when the master locking repository responds to the query from each corresponding one of the plurality of libraries.

18. The method of claim 17, further comprising:
detecting a shutdown of the first application through the distributed network;
selecting one of the plurality of slave locking repositories as a new master locking repository;
transferring data in the master locking repository to the selected slave locking repository;
determining if the data transfer was successful;
designating the selected slave locking repository as the master locking repository, if the data transfer was successful.

19. The method of claim 18, wherein if the data transfer was unsuccessful, then:
selecting one of the plurality of slave locking repositories as a new master locking repository.

20. A system comprising:
a plurality of shared resources remotely coupled to a first computing platform by a distributed network;
the first computing platform including:
a first Java virtual machine (JVM) including a first application, the first application includes a first library object; and
a second JVM including a second application, the second application includes a second library object;
logic for receiving a request, the request being forwarded over the distributed network for a selected one of the plurality of shared resources in a master locking repository, the request being from the first application, the first application being remote from the shared resource;
logic for determining if the shared resource is identified as available in the master locking repository; and
logic for locking the shared resource to the requestor in the master locking repository, if the selected shared resource is identified as available in the master locking repository.

21. The system of claim 20, wherein the first library object includes the master locking repository if the first application was instantiated before the second application and wherein the second library includes a slave locking repository.

22. The system of claim 20, wherein the second library object includes the master locking repository if the second application was instantiated before the first application and wherein the first library includes a slave locking repository.

* * * * *